US010216035B2

United States Patent
Jang

(10) Patent No.: US 10,216,035 B2
(45) Date of Patent: Feb. 26, 2019

(54) CONNECTOR, LIGHT SOURCE MODULE INCLUDING THE CONNECTOR, AND LIGHT SOURCE MODULE ARRAY INCLUDING THE LIGHT SOURCE MODULE

(71) Applicant: SAMSUNG ELECTRONICS CO., LTD., Suwon-si (KR)

(72) Inventor: June Jang, Seoul (KR)

(73) Assignee: SAMSUNG ELECTRONIC CO., LTD., Suwon-si (KR)

( * ) Notice: Subject to any disclaimer, the term of this patent is extended or adjusted under 35 U.S.C. 154(b) by 0 days.

(21) Appl. No.: 15/982,613

(22) Filed: May 17, 2018

(65) Prior Publication Data

US 2018/0267346 A1     Sep. 20, 2018

Related U.S. Application Data

(62) Division of application No. 15/150,960, filed on May 10, 2016, now Pat. No. 9,995,960.

(30) Foreign Application Priority Data

Aug. 19, 2015  (KR) .................. 10-2015-0116838

(51) Int. Cl.
*H01R 4/24*  (2018.01)
*G02F 1/13357*  (2006.01)
(Continued)

(52) U.S. Cl.
CPC ......... *G02F 1/1336* (2013.01); *H01R 4/4845* (2013.01); *G02F 1/133603* (2013.01);
(Continued)

(58) Field of Classification Search
CPC ..................................... H01R 4/4836
See application file for complete search history.

(56) References Cited

U.S. PATENT DOCUMENTS 4,768,981 A * 9/1988 Hohorst .............. H01R 4/4845
                                                           439/828
6,139,360 A    10/2000 Hayashi et al.
(Continued)

FOREIGN PATENT DOCUMENTS

DE           1918193    * 10/1970  ........... H01R 4/4836
DE      4016770 A1 * 11/1991  ........... H01R 4/4836
(Continued)

OTHER PUBLICATIONS

Notice of Allowance issued by the U.S. Patent and Trademark Office in parent U.S. Appl. No. 15/150,960 dated Feb. 15, 2018.

*Primary Examiner* — Tho D Ta
(74) *Attorney, Agent, or Firm* — Sughrue Mion, PLLC

(57) ABSTRACT

A connector, a light source module including the connector, and a light source module array including the light source module array are provided. The connector includes a first connection part configured to connect to a first wire inserted thereto; a second connection part configured to connect to a second wire inserted thereto, the first and second connection parts being disposed to face in opposite directions; a housing covering the first and second connection parts; and a push button configured to be actuated by an external force applied thereto to release a connection of the first connection part to the first wire and a connection of the second connection part to the second wire.

18 Claims, 11 Drawing Sheets

(51) Int. Cl.
  *H01R 12/73* (2011.01)
  *H01R 12/00* (2006.01)
  *H01R 4/48* (2006.01)
  *H01R 12/53* (2011.01)
  *G02F 1/1335* (2006.01)

(52) U.S. Cl.
  CPC ............ *G02F 2001/133612* (2013.01); *H01R 4/4836* (2013.01); *H01R 9/096* (2013.01); *H01R 12/53* (2013.01); *H01R 12/732* (2013.01)

(56) References Cited

U.S. PATENT DOCUMENTS

| | | | |
|---|---|---|---|
| 6,372,608 B1 | 4/2002 | Shimoda et al. | |
| 6,645,830 B2 | 11/2003 | Shimoda et al. | |
| 6,660,935 B2 | 12/2003 | Southard et al. | |
| RE38,466 E | 3/2004 | Inoue et al. | |
| 6,818,465 B2 | 11/2004 | Biwa et al. | |
| 6,818,530 B2 | 11/2004 | Shimoda et al. | |
| 6,858,081 B2 | 2/2005 | Biwa et al. | |
| 6,962,512 B2 * | 11/2005 | Moret Codina | H01R 4/4836 439/441 |
| 6,967,353 B2 | 11/2005 | Suzuki et al. | |
| 7,002,182 B2 | 2/2006 | Okuyama et al. | |
| 7,084,420 B2 | 4/2006 | Kim et al. | |
| 7,087,932 B2 | 8/2006 | Okuyama et al. | |
| 7,154,124 B2 | 12/2006 | Han et al. | |
| 7,208,725 B2 | 4/2007 | Sherrer et al. | |
| 7,288,758 B2 | 10/2007 | Sherrer et al. | |
| 7,319,044 B2 | 1/2008 | Han et al. | |
| 7,377,669 B2 | 5/2008 | Farmer et al. | |
| 7,501,656 B2 | 3/2009 | Han et al. | |
| 7,628,640 B2 | 12/2009 | Radle | |
| 7,709,857 B2 | 5/2010 | Kim et al. | |
| 7,759,140 B2 | 7/2010 | Lee et al. | |
| 7,781,727 B2 | 8/2010 | Sherrer et al. | |
| 7,790,482 B2 | 9/2010 | Han et al. | |
| 7,940,350 B2 | 5/2011 | Jeong | |
| 7,959,312 B2 | 6/2011 | Yoo et al. | |
| 7,964,881 B2 | 6/2011 | Choi et al. | |
| 7,985,976 B2 | 7/2011 | Choi et al. | |
| 7,994,525 B2 | 8/2011 | Lee et al. | |
| 8,008,683 B2 | 8/2011 | Choi et al. | |
| 8,013,352 B2 | 9/2011 | Lee et al. | |
| 8,049,161 B2 | 11/2011 | Sherrer et al. | |
| 8,129,711 B2 | 3/2012 | Kang et al. | |
| 8,179,938 B2 | 5/2012 | Kim | |
| 8,263,987 B2 | 9/2012 | Choi et al. | |
| 8,324,646 B2 | 12/2012 | Lee et al. | |
| 8,399,944 B2 | 3/2013 | Kwak et al. | |
| 8,432,511 B2 | 4/2013 | Jeong | |
| 8,459,832 B2 | 6/2013 | Kim | |
| 8,475,000 B2 | 7/2013 | Tamai | |
| 8,502,242 B2 | 8/2013 | Kim | |
| 8,536,604 B2 | 9/2013 | Kwak et al. | |
| 8,735,931 B2 | 5/2014 | Han et al. | |
| 8,766,295 B2 | 7/2014 | Kim | |
| 9,166,327 B2 | 10/2015 | Yu | |
| 9,419,357 B2 | 8/2016 | Urano | |
| 2005/0106932 A1 | 5/2005 | Miyazawa | |
| 2010/0127639 A1 | 5/2010 | Cha | |
| 2010/0142205 A1 | 6/2010 | Bishop | |
| 2011/0013400 A1 | 1/2011 | Kanno et al. | |
| 2013/0157520 A1 * | 6/2013 | Koellmann | H01R 4/4836 439/834 |
| 2013/0178114 A1 | 7/2013 | Nagase et al. | |
| 2013/0223068 A1 | 8/2013 | Choi | |
| 2014/0299893 A1 | 10/2014 | Weng | |
| 2015/0003064 A1 | 1/2015 | Choi et al. | |

FOREIGN PATENT DOCUMENTS

| | | | | |
|---|---|---|---|---|
| DE | 202013002763 U1 * | 7/2013 | ........... | H01R 4/4836 |
| KR | 10-2008-0086105 A | 9/2008 | | |
| KR | 10-0894258 B1 | 4/2009 | | |
| KR | 10-2010-0049750 A | 5/2010 | | |
| KR | 10-2011-0137648 A | 12/2011 | | |
| KR | 10-2012-0050287 A | 5/2012 | | |
| KR | 10-2015-0002046 A | 1/2015 | | |

* cited by examiner

A – A'

B – B'

C - C'

B - B'

C - C'

CONNECTOR, LIGHT SOURCE MODULE INCLUDING THE CONNECTOR, AND LIGHT SOURCE MODULE ARRAY INCLUDING THE LIGHT SOURCE MODULE

CROSS-REFERENCE TO RELATED APPLICATION

This is a divisional application of U.S. application Ser. No. 15/150,960 filed on May 10, 2016, which claims priority from Korean Patent Application No. 10-2015-0116838, filed on Aug. 19, 2015 in the Korean Intellectual Property Office, the disclosures of which are incorporated herein by reference in their entirety.

BACKGROUND

The present inventive concept relates to a connector, a light source module including the connector, and a light source module array including the light source module array.

Light emitting diodes (LEDs) are semiconductor light emitting devices capable of generating various colors of light through the recombination of electrons and holes at a junction between p-type and n-type semiconductor materials when a current is applied thereto. Compared to filament-based light emitting devices, such light emitting diodes have favorable characteristics such as a relatively extended lifespans, low power consumption, excellent initial operating characteristics, a high degree of vibration resistance, and the like. Hence, demand for light emitting diodes is continuously increasing. In particular, a group III nitride semiconductor capable of emitting light in a blue-based short wavelength region has come to prominence.

In the case of light emitting modules used in liquid crystal display (LCD) backlight units, cold cathode fluorescent lamps (CCFLs) according to the related art have been used. However, since such CCFLs operate using a mercury gas, this may lead to environmental pollution. Furthermore, CCFLs operate with a low-speed response time, have low color reproducibility, and are not suitable for use with lightweight, slim and compact LCD panels. As compared to CCFLs according to the related art, LEDs are environmentally-friendly and able to operate with a high-speed response time on the level of several nanoseconds so as to be effective for video signal streams, and are also able to be impulse-driven. In addition, LEDs have 100% color reproducibility and are able to not only adjust a quantity of light emitted by red, green and blue LEDs to optionally change degrees of brightness, color temperatures, or the like, but may also be suitable for use with lightweight, slim and compact LCD panels. A current trend, therefore, is to actively employ LEDs in light emitting modules for backlight units.

In view of the above, the range in which light emitting diodes are employed as light emitting modules for backlight units is increasing, and research into reducing manufacturing costs and manufacturing times thereof has been continuously conducted. In particular, technology for reducing costs of manufacturing a light source module and a light source module array and the time taken in the coupling light source modules to each other has been proposed.

SUMMARY

Example embodiments provide a connector, a light source module including the connector, and a light source module array including the light source module, in which costs for manufacturing a light source module and a light source module array may be reduced and a manufacturing time thereof may be reduced.

According to an aspect of an example embodiment, there is provided a connector including a first connection part configured to connect to a first wire inserted thereto; a second connection part configured to connect to a second wire inserted thereto, the first and second connection parts being disposed to face in opposite directions; a housing covering the first and second connection parts; and a push button configured to be actuated by an external force applied thereto to release a connection of the first connection part to the first wire and a connection of the second connection part to the second wire.

An upper surface of the housing may have a hole through which the push button is externally exposed, and the push button may be actuated to move within the housing by application the external force.

Each of the first and second connection parts may include: a soldering portion having a plate shape and configured to be soldered to a circuit board; a pair of covering portions extending in a direction intersecting an upper surface of the soldering portion and having portions which are bent to surround a corresponding one of the first and second wires; a pair of fastening portions extending from the covering portions, respectively, and connected to the corresponding one of the first and second wires inserted from a position adjacent to an end of the covering portion; and a pair of fastening release portions disposed above the fastening portions, respectively, spaced apart from each other by a gap, and configured to release a connection of the corresponding one of the first and second wires to the fastening portions when the portion of the push button is inserted into the gap by application of the external force to the push button.

The connector may further included an elastic member that supports the push button in a position separating the push button from the fastening release portions.

The connector may further included an insulating barrier disposed between the first and second connection parts to electrically isolate the first and second connection parts from each other.

The push button may configured to be actuated by the external force applied thereto to release mechanical and electrical connections between the first connection part and the first wire and mechanical and electrical connections between the second connection part and the second wire by the force applied to the push button externally.

The first and second connection parts may be symmetrical to each other relative to the push button.

The housing may be provided by molding the first and second connection parts.

At least a portion of the soldering portion may be exposed downwardly of the housing to be bent in a direction in which the wire extends.

According to an aspect of another example embodiment, there is provided light source module including: a circuit board; a plurality of light emitting devices disposed on the circuit board; and at least one connector disposed on a surface of the circuit board and electrically connected to the plurality of light emitting devices, wherein the connector includes: a first connection part configured to receive and connect to a first wire inserted thereto; a second connection part configured to receive and connect to a second wire inserted thereto, the first and second connection parts being disposed to face in opposite directions; a housing covering the first and second connection parts; and a push button configured to be actuated by an external force applied thereto to release a connection of the first connection part to the first wire and a connection of the second connection part to the second wire.

The circuit board may be a bar-type circuit board.

The connector may be disposed on only one side on the circuit board.

The at least one connector may include first and second connectors, and the first and second connectors may be spaced apart from the plurality of light emitting devices by a predetermined distance.

The first and second connection parts may be spaced apart from each other.

The circuit board may include a hole into which the housing is inserted.

According to an aspect of another example embodiment, there is provided light source module array including: a plurality of light source modules, each of the plurality of light source modules including: a circuit board; a plurality of light emitting devices disposed on the circuit board, and first and second connectors disposed on a surface of the circuit board and electrically connected to the plurality of light emitting devices, wherein each of the first and second connectors includes first and second connection parts disposed in opposite directions and electrically connected to wires inserted into the first and second connection parts, and the wires inserted into the first and second connection parts electrically connect the second connector of one of the plurality of light source modules to the first connector of a light source module adjacent thereto among the plurality of light source modules.

The plurality of light source modules may be connected to each other in series by the wires inserted into the first and second connection parts.

The wires inserted into the first and second connection parts may electrically connect a second connection part of the second connector of one of the plurality of light source modules to a first connection part of the first connector of a light source module adjacent thereto among the light source modules.

The plurality of light source modules may be connected in parallel by the wires inserted into the first and second connection parts.

The wires inserted into the first and second connection parts may electrically connect a first connection part of the second connector of one of the plurality of light source modules to a first connection part of the first connector of a light source module adjacent thereto among the light source modules, and electrically connect a second connection part of the second connector of one of the plurality of light source modules to a second connection part of the first connector of a light source module adjacent thereto among the light source modules.

According to an aspect of another exemplary embodiment, there is provided a connector including: a first connection part configured to receive and electrically connect to a first wire inserted into the first connection part in a first direction; a second connection part configured to receive and electrically connect to a second wire inserted into the second connection part in a second direction that is opposite to the first direction, the first and second connection parts being symmetrically aligned with each other in a same plane; and a housing covering the first and second connection parts.

The connector may further included a push button configured to be actuated by application of a pressing force applied thereto to cause release of a connection of the first connection part to the first wire and a connection of the second connection part to the second wire.

The first and second connection parts may be electrically isolated from each other.

The housing may include an upper surface having a hole through which the push button is exposed.

The housing may further include a first side surface having a first insertion hole through which the first wire is inserted, and a second side surface opposite to the first side surface and having a second insertion hole through which the second wire is inserted.

BRIEF DESCRIPTION OF DRAWINGS

The above and/or other aspects will be more clearly understood from the following detailed description taken in conjunction with the accompanying drawings, in which.

DETAILED DESCRIPTION

Figure 1:
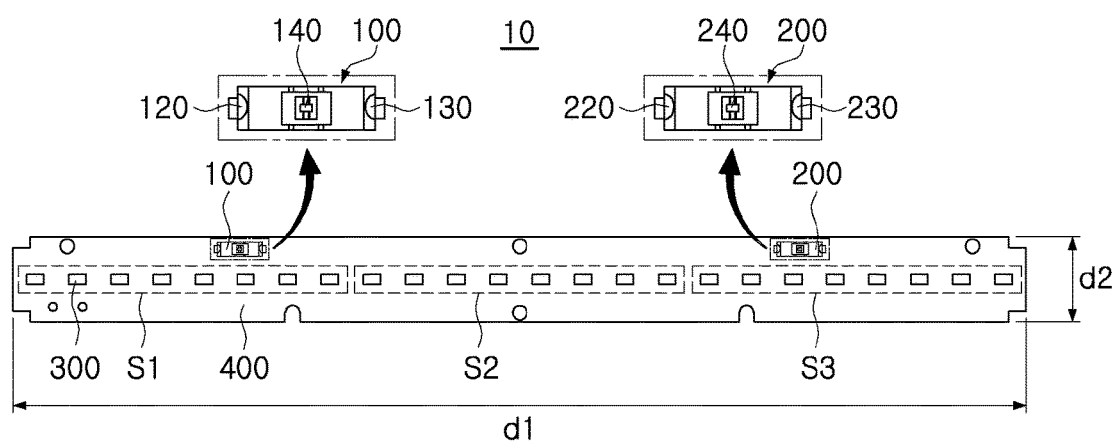
FIG. 1 is a schematic plan view of a light source module according to an example embodiment.

Various embodiments will now be described more fully with reference to the accompanying drawings in which some embodiments are shown. The present disclosure may, however, be embodied in different forms and should not be construed as limited to the embodiments set forth herein. Rather, these embodiments are provided so that this disclosure is thorough and complete and fully conveys the present disclosure to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When an embodiment can be implemented differently, functions or operations described in a particular block may occur in a different way from a flow described in the flowchart. For example, two consecutive blocks may be performed simultaneously, or the blocks may be performed in reverse according to related functions or operations. A light source module according to an example embodiment will be described with reference to FIG. 1. FIG. 1 is a schematic plan view of a light source module according to an example embodiment.

With reference to FIG. 1, a light source module 10 may include a circuit board 400 on which a plurality of light emitting devices 300 are disposed, and connectors 100 and 200 disposed on one surface of the circuit board 400.

The circuit board 400 may include a circuit wiring electrically connected to the plurality of light emitting devices 300, and may have a bar-type plate shape extending lengthwise in a single direction. Such a shape of the circuit board 400 may be suitable to configure a backlight unit through an arrangement thereof in a row or a column on a chassis structure of an LCD panel, but a shape of the circuit board is not limited thereto. For example, a shape of the circuit board 400 may be variously altered.

In addition, the circuit board 400 may be provided as a printed circuit board (PCB) and may be formed of an organic resin material containing an epoxy, a triagine, a silicone, a polyimide, or the like, or another organic resin material. Further, the circuit board 400 may be formed of a ceramic material such as AlN, $Al_2O_3$, or the like, a metal, or a metallic compound, and an example of the circuit board 400 may include, for example, a metal-core PCB (MCPCB) as a metal PCB.

As the light emitting devices 300, any device capable of emitting light when an electrical signal is applied thereto may be used. In an example embodiment, as the light emitting devices 300, light emitting diodes (LED) may be used. As such a light emitting diode, a semiconductor light emitting device obtained by allowing for epitaxial growth of a semiconductor layer on a growth substrate may be used.

As the growth substrate, a sapphire substrate may be used, but the growth substrate is not limited thereto. For example, a growth substrate such as a spinel substrate, a SiC substrate, a GaN substrate, a GaAs substrate, or the like may be used. In detail, the light emitting device 300 may be formed of BN, SiC, ZnSe, GaN, InGaN, InAlGaN, AlGaN, BAlGaN, BInAlGaN, or the like, and may be doped with Si, Zn, or the like.

An active layer of the light emitting device 300 may be a nitride semiconductor formed of $Al_xIn_yGa_{1-x-y}N$ ($0 \leq x \leq 1$, $0 \leq y \leq 1$, $0 \leq x+y \leq 1$), and may also be a single or multiple quantum well structure to improve light output.

In this case, the light emitting device 300 may be a nitride semiconductor emitting light having a short wavelength of 300 nm to 460 nm in which light emitted therefrom may be converted into white light by a wavelength conversion material such as a phosphor or a quantum dot.

A plurality of light emitting devices 300 may be provided on the circuit board 400, and the plurality of light emitting devices 300 may be electrically connected to each other. For example, the plurality of light emitting devices 300 may be connected to each other in series or in parallel. Further, the plurality of light emitting devices 300 may also be connected to each other in a serial-parallel structure.

For example, when the circuit board 400 has a bar shape, the plurality of light emitting devices 300 may be arranged on the circuit board 400 with equivalent distances therebetween in a length direction d1 of the circuit board 400. In addition, the light emitting devices 300 may be disposed on a position of the circuit board at which a width d2 of the circuit board 400 is halved. The light emitting devices 300 may be mounted on the circuit board 400 in chip form, in a so-called chip on board (COB) structure, and may also be packaged and mounted thereon.

In detail, in an example embodiment, a total of 24 light emitting devices 300 may be arranged on the circuit board 400 having a bar shape in the length direction d1 of the circuit board as illustrated in FIG. 1. In this case, the 24 light emitting devices 300 may be divided into light emitting device strings S1 to S3 of which each string includes eight light emitting devices as a group. The light emitting device strings S1 to S3 may be connected in parallel, and eight light emitting devices 300 of each of the light emitting device strings S1 to S3 may be connected in series, but the number and disposition of the light emitting devices 300 are not limited thereto and may be variously altered.

The connectors 100 and 200 may be configured to apply power to the plurality of light emitting devices 300, and at least a pair of connectors may be provided on one surface of the circuit board 400. According to an example embodiment, the connectors may be disposed on only one side, based on a position of the plurality of light emitting devices 300, on a surface of the circuit board 400 on which the light emitting devices 300 are mounted.

First connection parts 120 and 220 and second connection parts 130 and 230 into which wires for applying power thereto are respectively inserted and fixed thereto may be disposed on two ends of the connectors 100 and 200, respectively. Since the first connection parts 120 and 220 and the second connection parts 130 and 230 are disposed on two ends of the connectors 100 and 200, respectively, to face in opposite directions, respective wires inserted into the first connection parts 120 and 220 and the second connection parts 130 and 230, respectively, may be inserted in opposite directions.

The light source module 10 in which the connectors 100 and 200 according to the example embodiment are employed may exhibit an effect of reducing manufacturing costs and a manufacturing time thereof as compared to a light source module using an existing connector. This will be described below.

Although a light source module according to an example embodiment may be applied to various technical fields, a case in which the light source module is applied to a backlight unit of an LCD panel will be described below by way of example. A backlight unit should be able to uniformly emit light to an LCD panel. Thus, in order to allow for a uniform distribution of light thereon, a relatively large number of light source modules may be disposed on a chassis structure of an LCD panel.

In the related art, a light source module is configured using a so-called two-pin connector in which first and second connection parts connecting wires to each other are disposed on one end of a connector in a single direction. In this case, since such a two-pin connector is configured so that the first and second connection parts are disposed in parallel in the same direction, the connector should have a width able to allow two wires to be inserted thereinto.

Thus, there was a problem in that a circuit board having a relatively wide width should be used in order to allow for a two-pin connector to be mounted thereon. Such a circuit board having a relatively wide width has a problem in that manufacturing costs may be increased and there may be an obstacle in terms of disposing a relatively large number of light source modules on a chassis structure of the LCD panel.

In order to reduce such a problem, a one-pin connector having a relatively narrow width has also been used, but since one-pin connector is a connector in which only one connection part is disposed, the number of mounted connectors should be twice the number of connectors used in the case that a two-pin connector is used. Thus, a problem in that a manufacturing time is increased has also occurred therewith. Furthermore, in this case, since the number of connectors is increased, manufacturing costs are also increased.

In order to solve such problems, according to an example embodiment, the connectors 100 and 200 having a structure in which the first connection parts 120 and 220 and the second connection parts 130 and 230 having wires inserted thereinto are disposed in the same linear portion in opposite directions may be provided.

Thus, the connector 100 may have a width reduced by half as compared to the case of a width of an existing two-pin connector in which first and second connection parts are disposed on one end of the connector to be located in the same direction. Thus, in terms of an area of a circuit board on which a connector is to be mounted, the area may also be reduced by half or less as compared to an area of a circuit board on which the first and second connection parts are provided on one end of the connector in the same direction. Thus, since a circuit board having a relatively narrow width d2 as compared to an existing circuit board may be used, a cost of manufacturing a circuit board may be reduced.

In addition, since the first connection parts 120 and 220 and the second connection parts 130 and 230 are disposed on two opposite ends of the connectors 100 and 200 to face in opposite directions, respectively, a short circuit between wires inserted into the first and second connection parts, respectively, may be fundamentally prevented, as compared to the case in which the first and second connection parts are disposed on one end of the connector in the same direction.

Further, as compared to the case of using one-pin connector, the number of connectors according to an example embodiment may be reduced by half, and thus, manufacturing costs thereof may be reduced, and the time taken in mounting the connector on a board may be reduced.

Figure 2:
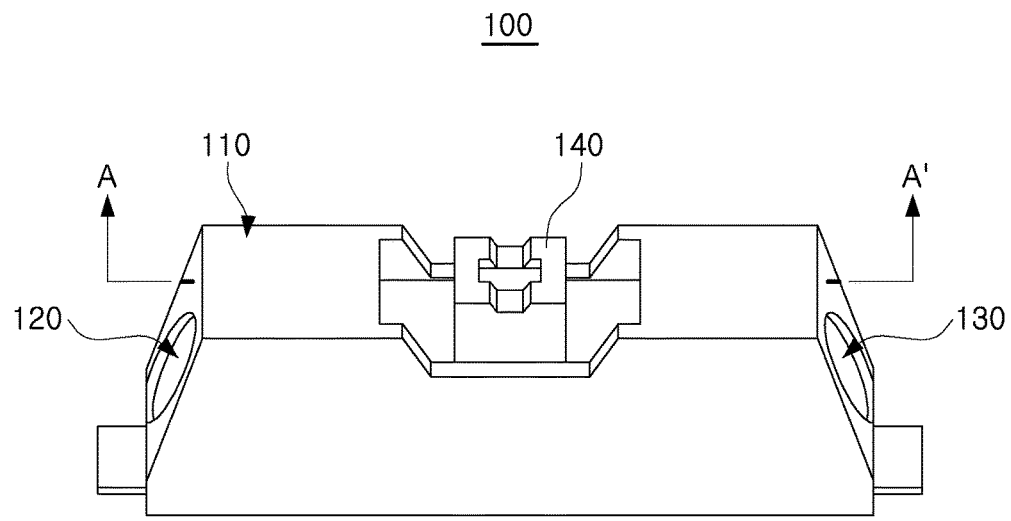
FIG. 2 is a perspective view of the connector of FIG. 1.
Figure 3:
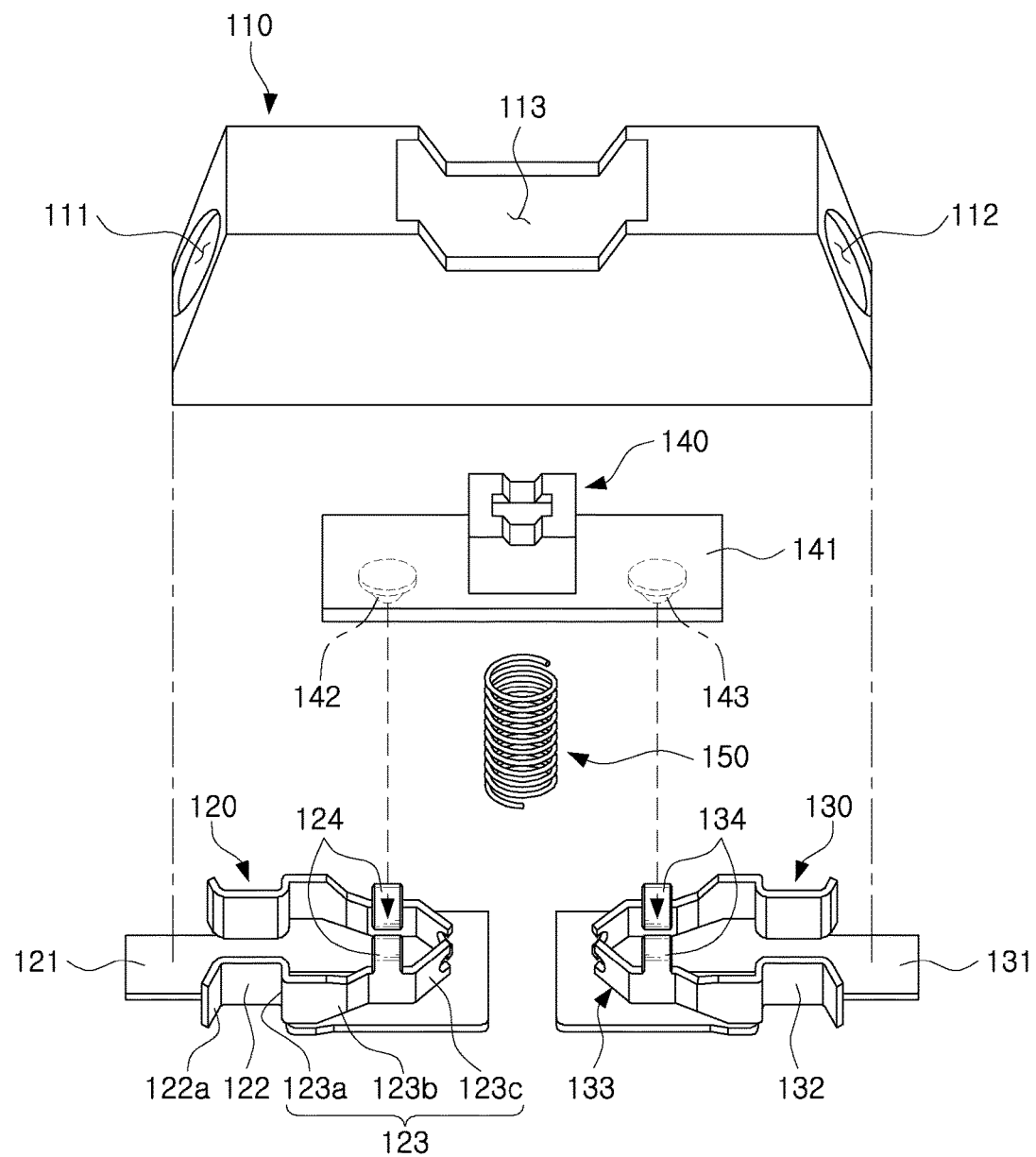
FIG. 3 is an exploded perspective view of the connector illustrated in FIG. 2.
Figure 4:
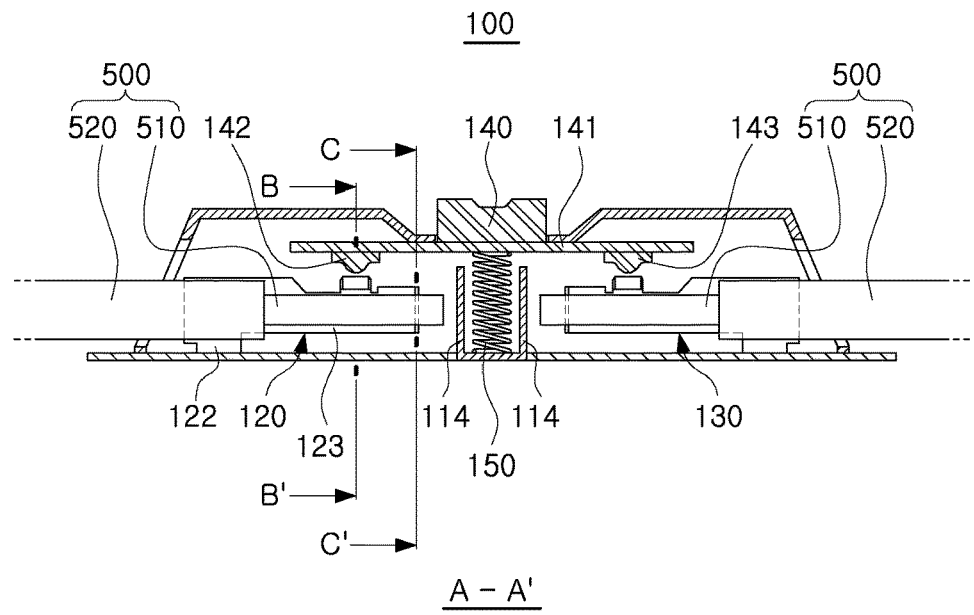
FIG. 4 is a cross-sectional view illustrating a wire inserted into the connector of FIG. 2.

With reference to FIGS. 2 to 6B, the connector 100 will be described in detail. FIG. 2 is a perspective view of the connector of FIG. 1, and FIG. 3 is an exploded perspective view of the connector illustrated in FIG. 2. FIG. 4 is a cross-sectional view illustrating that a wire is inserted into the connector of FIG. 2, and FIGS. 5A to 6B illustrate that a connection of wires is released by pressing a push button.

With reference to FIG. 2, the connector 100 may include first and second connection parts 120 and 130 to which wires are connected, a housing 110 covering the first and second connection parts 120 and 130, and a push button 140 which may actuated to by an external pressing force to release a connection between the wires and the first and second connection parts 120 and 130.

With reference to FIG. 3, the first and second connection parts 120 and 130 may include soldering portions 121 and 131, covering portions 122 and 132, fastening portions 123 and 133, and fastening release portions 124 and 134, respectively. The first and second connection parts 120 and 130 may be disposed in opposite directions. For example, when the connector 100 is mounted on the circuit board 400, the first and second connection parts 120 and 130 may be disposed in opposite directions toward two ends of the circuit board 400, respectively. The first and second connection parts 120 and 130 may be spaced apart from each other to prevent the occurrence of electrical short circuits therebetween. In addition, the first and second connection parts 120 and 130 may be disposed to be symmetrical to each other based on the push button 140.

An insulator electrically isolating the first and second connection parts 120 and 130 from each other may be further provided. According to an example embodiment, an insulating barrier 114 may be formed as the insulator in a portion of the housing 110 (see FIG. 4).

The first connection part 120 and the second connection part 130 have the same configuration, and thus, with respect to a detailed structure thereof, only the first connection part 120 will be described while omitting repeated descriptions of the second connection part 130.

The soldering portion 121 may be a portion soldered on and attached to the circuit board 400 when the connector 100 is mounted on the circuit board 400, and may have a substantially flat plate shape to facilitate soldering thereon.

The covering portions 122 may extend in a direction intersecting an upper surface of the soldering portion 121. The covering portions 122 may be configured as one pair of which portions of upper portions are respectively bent to surround a wire inserted thereinto in a direction in which one end of the soldering portion 121 is provided. Thus, the pair of covering portions 122 may respectively extend in a direction perpendicular to an upper surface of the soldering portion 121, and may be provided with stop protrusions 122a protruded outwardly from the vertically extended portions of the covering portions 122 to be firmly coupled to an internal surface of the housing 110, respectively.

The fastening portions 123 may be provided as a pair respectively extending from the covering portion 122, and the pair of fastening portions 123 may be configured to have a distance therebetween reduced toward one end of the soldering portion 121. The fastening portions 123 may be connected to a wire inserted thereinto from a position adjacent to one end of the covering portion 122.

The fastening portion 123 may include first extension portions 123a bent in opposite directions to oppose each other while respectively extending from the covering portion 122 in a direction toward the other end of the soldering portion 121, second extension portions 123b extending from the first extension portions 123a in a direction toward the other end of the soldering portion 121, respectively, to be parallel to each other, and third extension portions 123c slopingly extending in opposite directions while extending from the second extension portions 123b in a direction toward the other end of the soldering portion 121, respectively, and having end portions between which a wire is inserted to be fastened thereto. Such a bending structure may allow for elastic force of the fastening portion 123 itself.

The fastening release portions 124 may be disposed on upper portions of the fastening portions 123, respectively, and may be disposed to oppose each other to have a gap therebetween into which a portion of the push button 140 is inserted. In detail, the fastening release portions 124 may extend from upper portions of the second extension portions 123b, respectively.

For example, the fastening release portions 124 and 134 may be configured to be able to release a connection of the wires in such a manner that a first protrusion portion 142 and a second protrusion portion 143 of the push button 140 are inserted into the gaps between the fastening release portions 124 and between the fastening release portions 134 when the connection of the wires is released to widen the gaps between the fastening portions 123 and between the fastening portions 133, respectively.

The housing 110 may be formed by molding an insulating resin. The housing 110 may have side surfaces and an upper surface, and a push-button exposure hole 113 allowing the push button 140 to be exposed upwardly may be formed in the upper surface of the housing. Two end portions of the housing 110 may have wire insertion holes 111 and 112 into which the wires are inserted, respectively.

The housing 110 may be formed by inserting the first and second connection parts 120 and 130 therein and performing insert injection molding thereon. In addition, the housing 110 may also be formed through double injection molding, but is not limited thereto. For example, the housing 110 may be separately manufactured to then be combined with the first and second connection parts 120 and 130. The insulating barrier 114 may also be disposed inside the housing 110 in such a manner that the first and second connection parts 120 and 130 are electrically isolated from each other.

The push button 140 may be disposed on the first and second connection parts 120 and 130 while being accommodated in an inner space of the housing 110, and thus, a connection of the first and second connection parts 120 and 130 may be released by force applied to the push button externally such as a pressing operation thereon. The push button 140 may include a stop portion 141, and the first and second protrusion portions 142 and 143.

An upper portion of the push button 140 may have a size less than that of the pushbutton exposure hole 113 to allow the upper portion thereof to be exposed through the push-button exposure hole 113, and thus, the upper portion of the push button 140 may pass through the push-button exposure hole 113.

The stop portion 141 may have a size substantially larger than that of the push-button exposure hole 113 to prevent the push button 140 from being separated therefrom through the push-button exposure hole 113.

The first and second protrusion portions 142 and 143 may be disposed below the stop portion 141. Further, the first and second protrusion portions 142 and 143 may be disposed above the fastening release portions 124 and 134, so as to be inserted into gaps between the fastening release portions 124 and between the fastening release portions 134, respectively, when external force is applied to the push button 140, to allow the fastening portions 123 and 133 to be widened, respectively, thereby allowing the wires to be removed therefrom. Thus, the wires respectively inserted into the fastening portions 123 and 133 may be removed once by pressing the push button 140.

Although the example embodiment illustrates the case in which the first and second protrusion portions 142 and 143 are disposed below a single push button 140, the configuration thereof may be changed, for example, two push buttons may be disposed on the first and second protrusion portions 142 and 143, respectively.

In addition, an elastic member such as a spring 150 may be disposed below the stop portion 141, and thus, when external force applied to the push button 140 is removed, the push button 140 may be elevated up to an original state thereof.

With reference to FIGS. 4 to 6B, a process of releasing the connection of the wires inserted into the connector 100 is illustrated below.

Figure 5A:
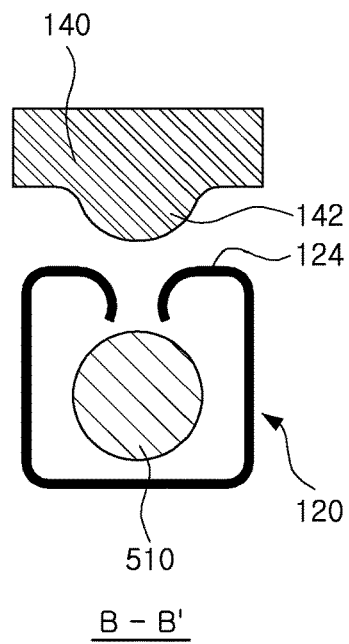
FIGS. 5A, 5B, 6A and 6B are views illustrating release of a connection of wires by pressing a push button.
Figure 5B:
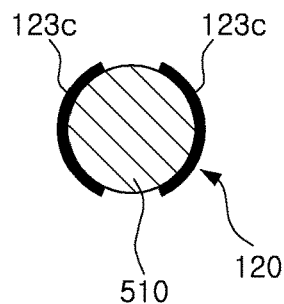

FIG. 4 illustrates a state in which the wires 500 are inserted into the first and second connection parts 120 and 130, respectively, in such a manner that clad portions 520 of the wires 500 are inserted into the covering portions 122 and 132, and electrical wires 510 are connected to the fastening portions 123 and 133, respectively. FIG. 5A is a cross sectional view of line B-B' of FIG. 4, and FIG. 5B is a cross sectional view taken along line C-C' of FIG. 4.

With reference to FIG. 5A, when a pressing force is not applied to the push button 140, the first protrusion portion 142 may be spaced apart from an upper portion of the fastening release portion 124. Further, as illustrated in FIG. 5B, the third extension portions 123c of the fastening portion 123 may be connected to the electrical wire 510.

Figure 6A:
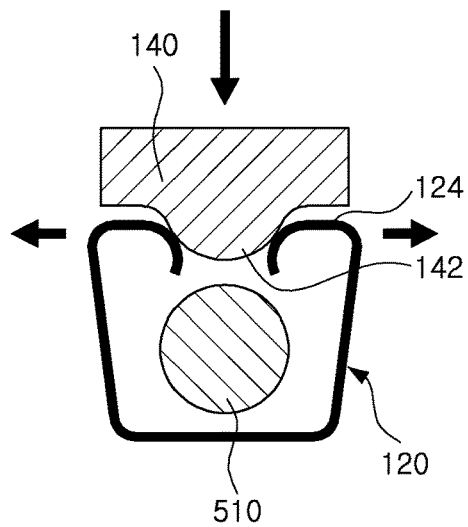
Figure 6B:
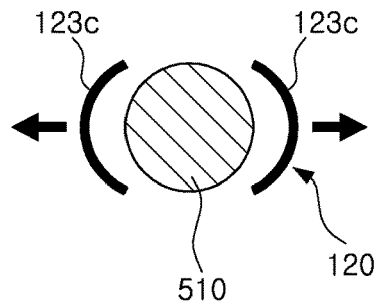

As illustrated in FIG. 6A, when pressing the push button 140, the first protrusion portion 142 may be inserted into a gap between the fastening release portions 124. Thus, the third extension portions 123c of the fastening portion 123 may be spaced apart from the electrical wire 510 to thus be released from the connection thereof to the wire.

The connection of the wire 500 is released and the wire 500 may be removed therefrom, and then, when the force applied to the push button 140 is removed, the push button 140 may be restored to an original state by elastic force of the spring 150 supporting the push button 140.

Figure 7:
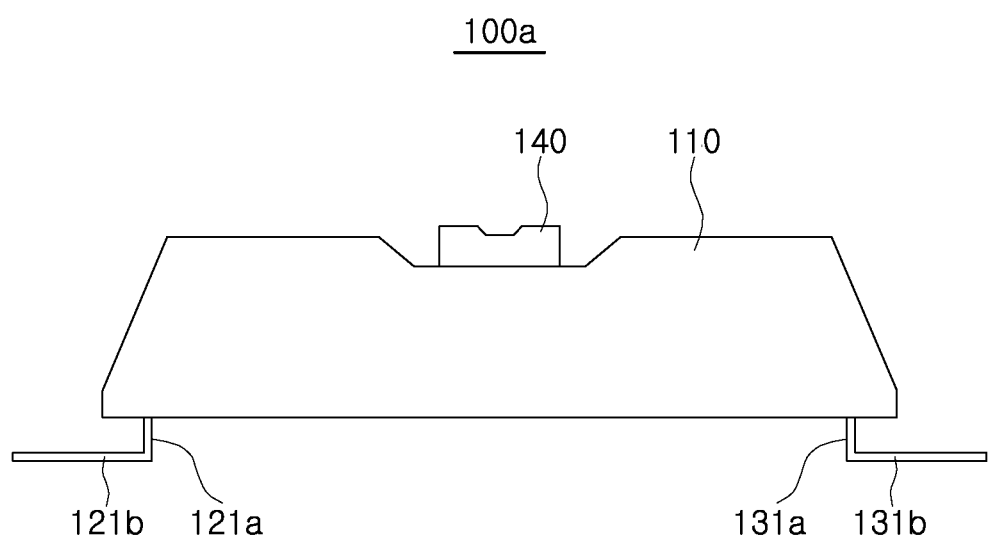
FIG. 7 illustrates a modified example of the connector of FIG. 2.

The configuration of the connector 100 may be changed as illustrated in FIG. 7.

FIG. 7 is a side view of a connector 100a in a modified example. The connector 100a according to a modified example may include extension portions 121a and 131a in which the soldering portions 121 and 131 are exposed externally of the housing 110, respectively, and flat portions 121b and 131b bent from the extension portions 121a and 131a, respectively, in a direction in which wires are inserted into the connector.

The connector 100a, in the modified example, may include the flat portions 121b and 131b of the soldering portions 121 and 131 disposed to be spaced apart from the housing 110. Through such a configuration, the wire may be inserted into a connection part of the connector from a position on the other surface of a chassis structure opposing a surface of the chassis structure on which a light emitting device is mounted when a light source module is mounted on the chassis structure, as illustrated below.

A plurality of light source modules 10 may be provided, and the plurality of light source modules 10 may be connected to each other in series or in parallel. This will be described below with reference to FIGS. 8 and 9.

Figure 8:
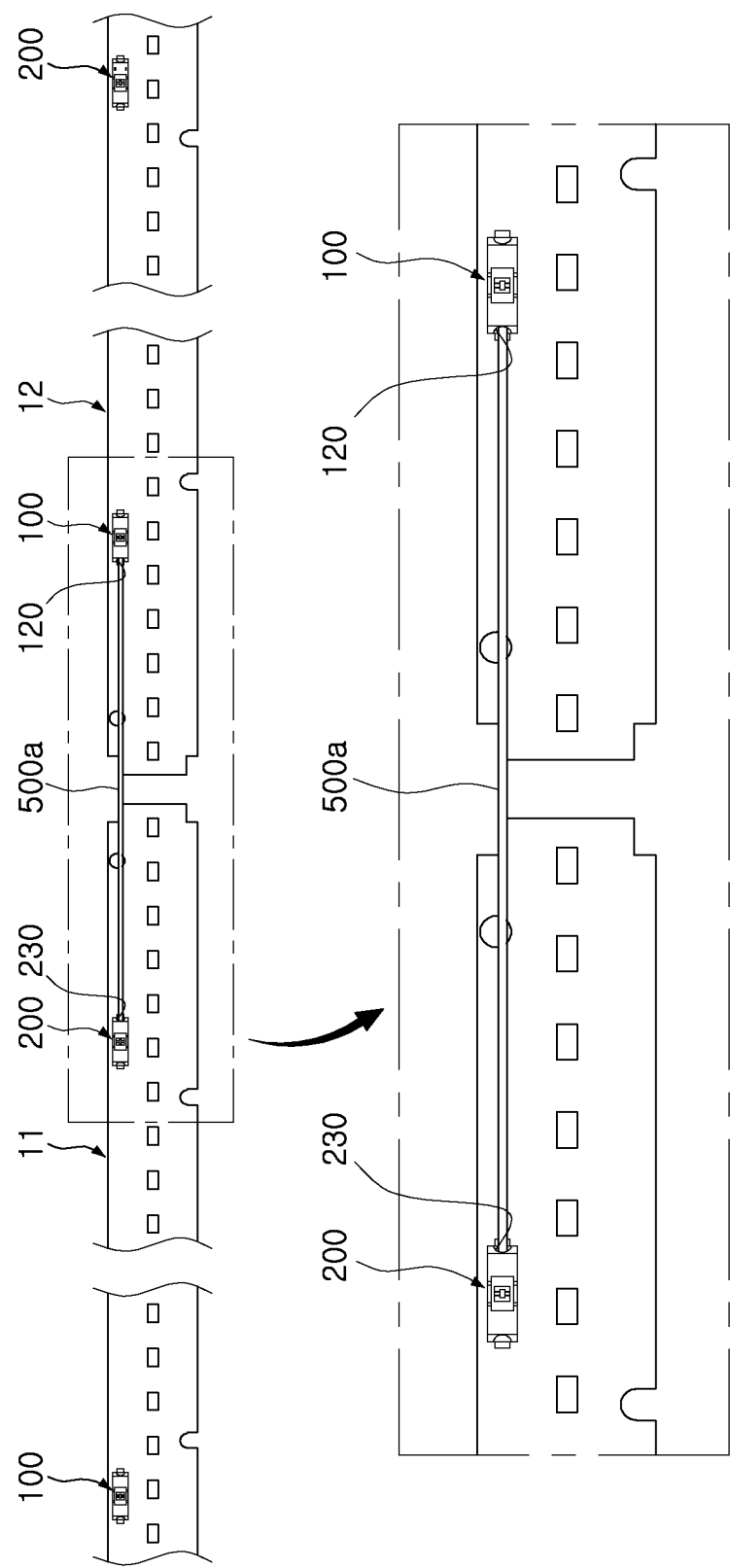
FIG. 8 illustrates an example in which a plurality of light source modules are connected in series.
Figure 9:
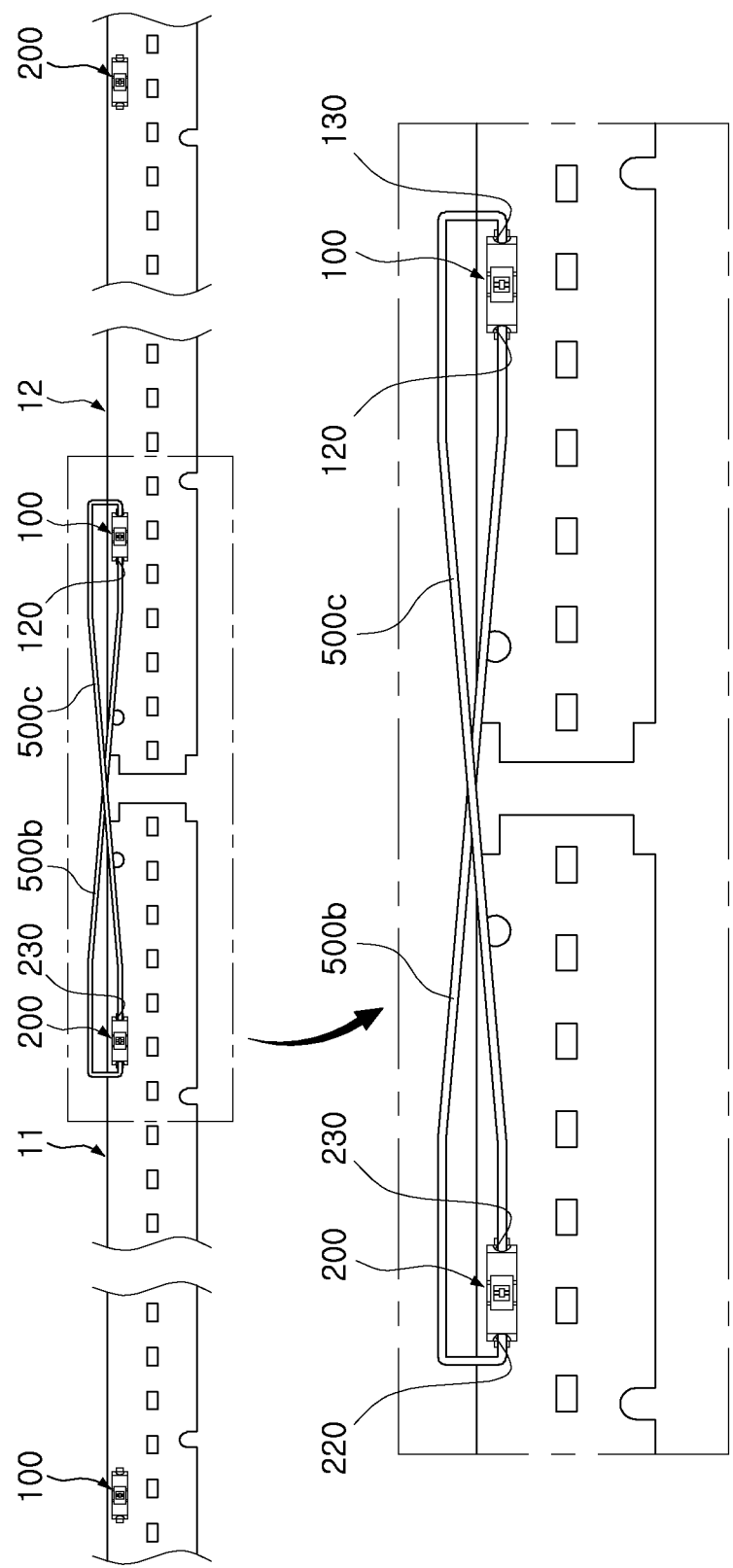
FIG. 9 is an example in which a plurality of light source modules are connected in parallel.

FIG. 8 is an example in which a plurality of light source modules are connected in series, and FIG. 9 is an example in which a plurality of light source modules are connected in parallel.

As illustrated in FIG. 8, a light source module 11 and a light source module 12 adjacent thereto may be connected to each other by a single wire 500a. Thus, two light source modules 11 and 12 may be connected to each other in series. In detail, a second connection part 230 of the connector 200 of the light source module 11 and a first connection part 120 of the connector 100 of the light source module 12 adjacent thereto may be connected to each other by the wire 500a. Thus, the two light source modules 11 and 12 may be connected to each other in series.

As illustrated in FIG. 9, any one light source module 11 and a light source module 12 adjacent thereto may be connected to each other by a pair of wires 500b and 500c, and thus, two light source modules 11 and 12 may be connected in parallel. In detail, a first connection part 220 of the connector 200 of the light source module 11 and a first connection part 120 of the connector 100 of the light source module 12 adjacent thereto may be connected to each other by the wire 500b, and a second connection part 230 of the connector 200 of the light source module 11 and a second connection part 130 of the connector 100 of the light source module 12 adjacent thereto may be connected to each other by the wire 500c. Thus, the two light source modules 11 and 12 may be connected in parallel.

Thus, if necessary, a connection of a circuit of the plurality of light source modules 11 and 12 may be easily changed by only changing a connection of a wire between the plurality of light source modules 11 and 12 according to an example embodiment.

Figure 10:
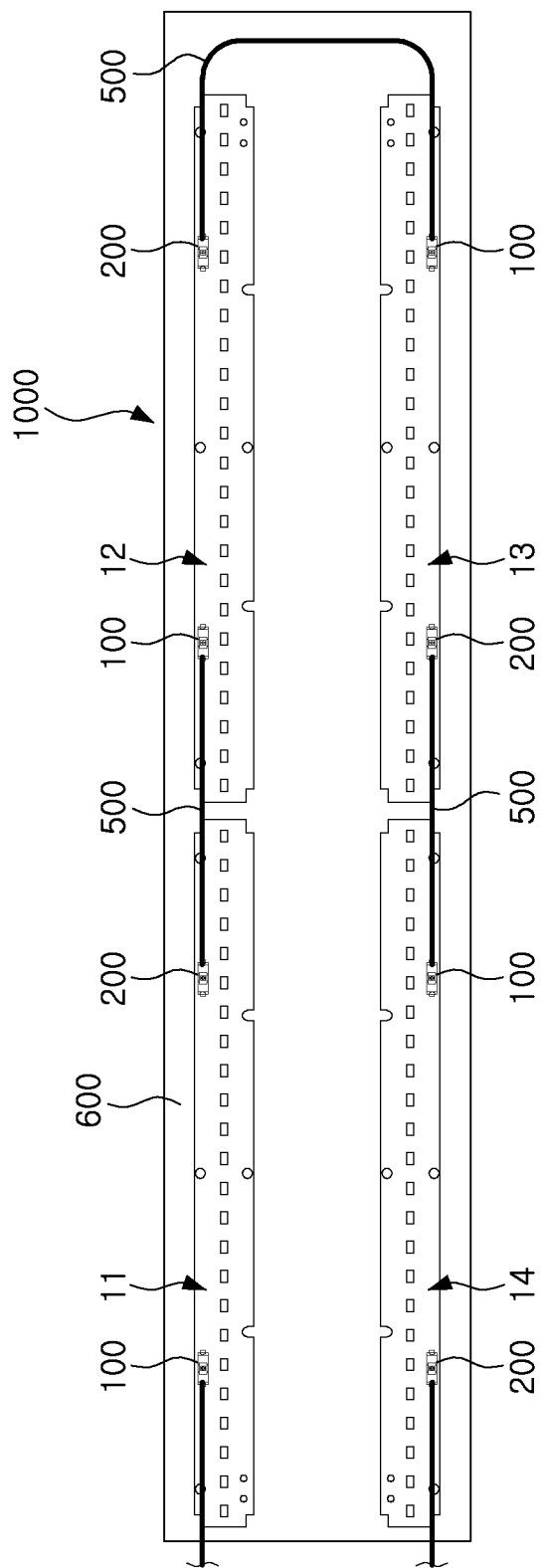
FIG. 10 illustrates a light source module array according to an example embodiment.

FIG. 10 illustrates an example in which a light source module array 1000 includes a plurality of light source modules 11 to 14.

The light source module array 1000 according to an example embodiment is illustrated as being configured in such a manner that four light source modules 11 to 14 are disposed in two rows and two columns on a chassis structure 600 of an LCD panel. Although the light source modules 11 to 14 are illustrated as being connected to each other in series by way of example, a circuit connection of the plurality of light source modules 11 to 14 may be easily changed by changing wiring of the wire 500 as described above.

The light source module array 1000 may be configured by disposing the light source modules 11 to 14 on the chassis structure 600 and then connecting the wires 500 to the connectors 100 and 200.

Figure 11A:
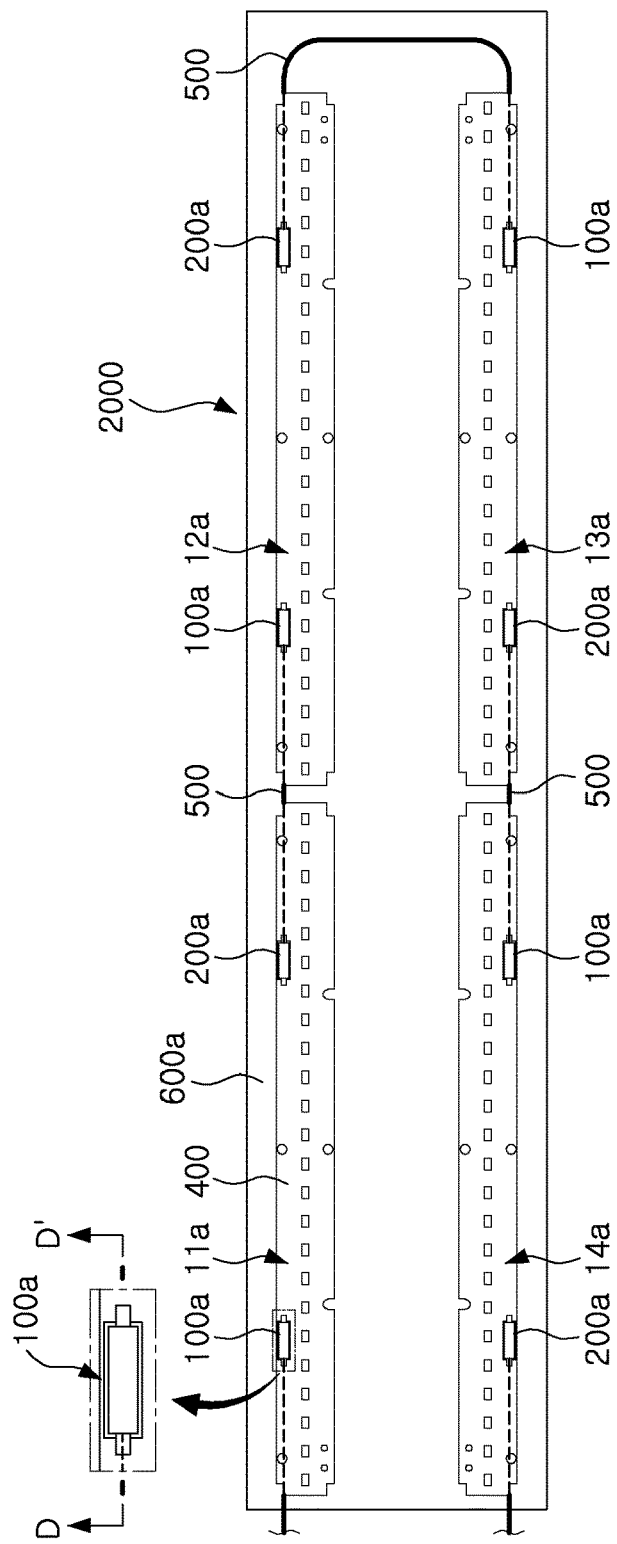
FIG. 11A illustrates a light source module array according to another example embodiment.
Figure 11B:
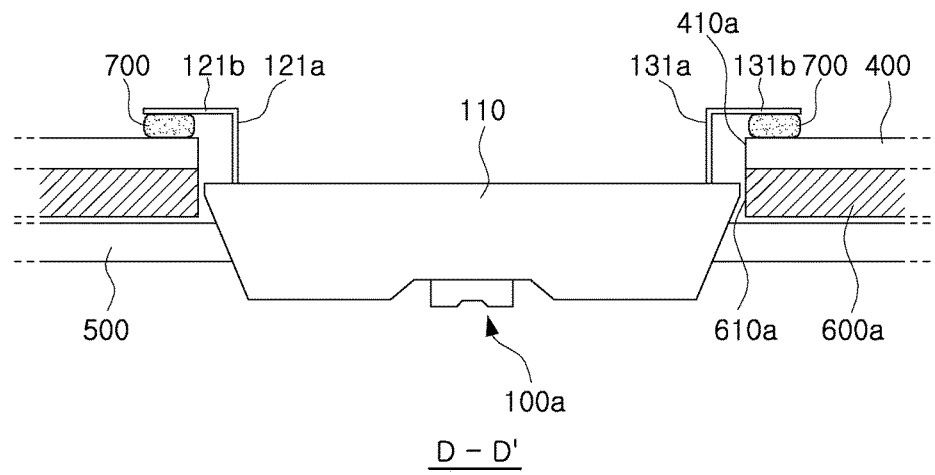
FIG. 11B is a cross-sectional view illustrating mounting of the connector of FIG. 11A.

FIGS. 11A and 11B illustrate another example of the light source module array. In another example embodiment with reference to FIGS. 11A and 11B, the configuration of connectors 100a and 200a may be different from that in the foregoing example embodiment. The connectors 100a and 200a employed in the present example embodiment may be provided as the connectors illustrated with reference to FIG. 7. Through connectors having a configuration different from that of the connector in the foregoing example embodiment, a method of wiring a wire 500 of a light source module array 2000 may be changed, and this will be principally described below.

As illustrated in FIG. 11B, the light source module array 2000 according to the example embodiment may include combination holes 410a and 610a penetrating through a circuit board 400 and a chassis structure 600a, respectively. The combination holes 410a and 610a may have a size able to allow a housing 110 of the connector 100a to be inserted thereinto, but not allow insertion of flat portions 121b and 131b. Thus, the flat portions 121b and 131b of the connector 100a may be disposed to contact a predetermined portion of the circuit board 400.

Thus, the circuit board 400 and the flat portions 121b and 131b may be soldered through a soldering 700 to be connected to each other. The housing 110 may be penetrated through the combination holes 410a and 610a to be protruded therefrom, and thus, the connection of the wire 500 may be performed on a lower portion of the chassis structure 600a.

Figure 12:
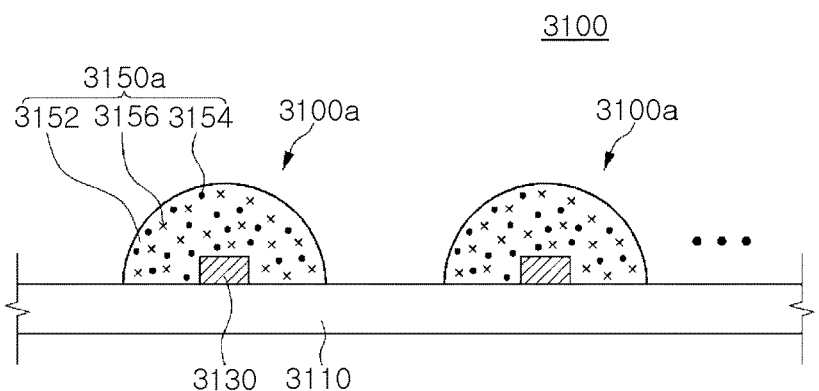
FIGS. 12 and 13 are drawings illustrating an example of light emitting devices employed in the light source module of FIG. 1.
Figure 13:
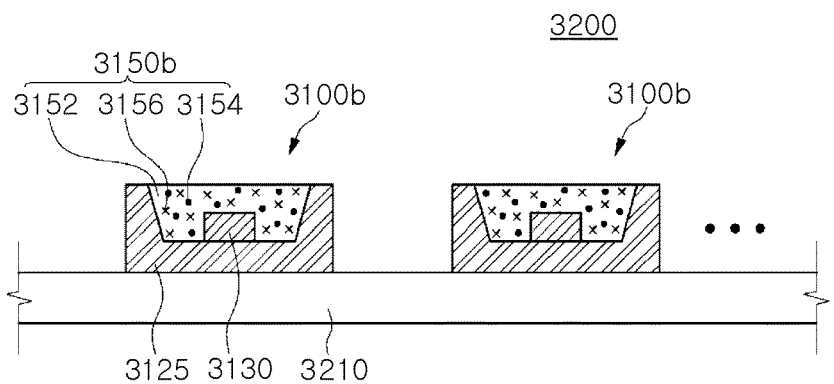

FIGS. 12 and 13 illustrate an example of the light emitting device 300 employed in the light source module of FIG. 1.

With reference to FIG. 12, a light source module 3100 may include a circuit board 3110 and a plurality of white light emitting devices 3100a arranged on the circuit board 3110. A conductive pattern connected to the white light emitting devices 3100a may be formed on the circuit board 3110.

Each of the white light emitting devices 3100a may have a structure in which a light emitting element 3130 emitting blue light is directly mounted on the circuit board 3110 in a chip on board (cob) scheme. Each white light emitting device 3100a may not have a separate reflective wall, and may have a semispherical shape in which a wavelength conversion portion 3150a has a lens function to exhibit a relatively wide angle of beam spread in light. Such a wide beam spread of light may contribute to a reduction in a thickness or a width of an LCD display.

With reference to FIG. 13, a light source module 3200 may include a circuit board 3110 and a plurality of white light emitting devices 3100b arranged on the circuit board 3110. Each of the white light emitting devices 3100b may include a light emitting element 3130 emitting blue light and disposed in a reflective cup of a package body 3125, and a wavelength conversion portion 3150b encapsulating the light emitting element 3130.

The wavelength conversion portions 3150a and 3150b may be formed in a manner in which a wavelength conversion material 3154 or 3156 such as a phosphor and/or a quantum dot is contained in a resin 3152.

Figure 14:
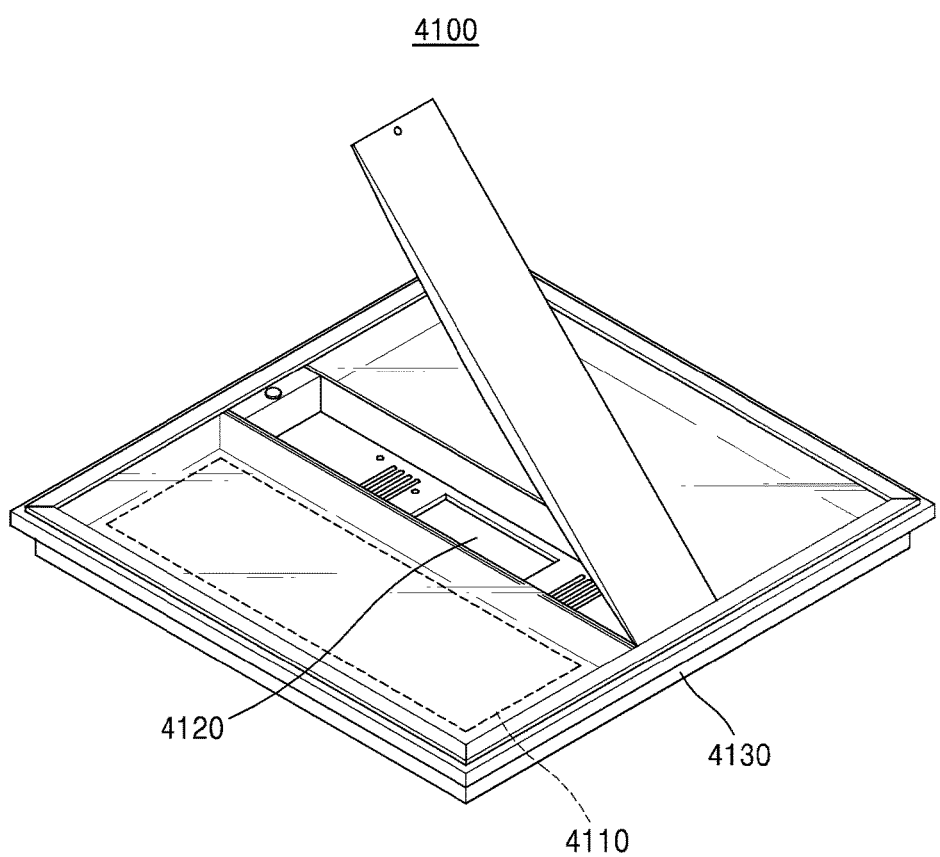
FIG. 14 illustrates an example of a lighting apparatus in which the light source module of FIG. 1 is employed.

With reference to FIG. 14, a planar lighting apparatus 4100 may include a light source module 4110, a power supply device 4120, and a housing 4130. According to an example embodiment, the light source module 4110 may include the light source module 10 of FIG. 1 described above, as a light source, and the power supply device 4120 may include a driving portion of the light source module 4110.

The light source module 4110 may include a plurality of light emitting devices, and may be formed to have a substantially planar shape. A light emitting device array according to an example of the present inventive concept may include a light emitting device and a controller storing driving information of the light emitting device therein.

The power supply device 4120 may be configured to supply power to the light source module 4110. The housing 4130 may have an accommodating space in which the light source module 4110 and the power supply device 4120 are accommodated, and may have a parallelepiped shape of which one side is open, but is not limited thereto. The light source module 4100 may be disposed in such a manner that light may be emitted through the open side of the housing 4130.

As set forth above, according to the example embodiments, a light source module and a light source module array in which a width of a light source module may be reduced, the time taken in connecting a wire to manufacture a light source module array may be reduced may be provided, thereby reducing a manufacturing time and manufacturing costs thereof.

In addition, a connector usable in manufacturing the light source module and the light source module array may be provided.

While example embodiments have been shown and described above, it will be apparent to those skilled in the art that modifications and variations could be made without departing from the scope of the inventive concept as defined by the appended claims.

What is claimed is:

1. A connector comprising:
a first connection part configured to connect to a first wire inserted thereto;
a second connection part configured to connect to a second wire inserted thereto, the first and second connection parts being disposed to face in opposite directions;
a housing covering the first and second connection parts; and
a push button configured to be actuated by an external force applied thereto to release a connection of the first connection part to the first wire and a connection of the second connection part to the second wire,
wherein each of the first connection part and the second connection part comprises:
a soldering portion having a plate shape and configured to be soldered to a circuit board;
a pair of covering portions extending in a direction intersecting an upper surface of the soldering portion and having portions which are bent to surround a corresponding one of the first and second wires;
a pair of fastening portions extending from the covering portions, respectively, and configured to be connected to the corresponding one of the first and second wires inserted from a position adjacent to an end of the covering portion; and
a pair of fastening release portions disposed above the fastening portions, respectively, spaced apart from each other by a gap, and configured to release a connection of the corresponding one of the first and second wires to the fastening portions when the portion of the push button is inserted into the gap by application of the external force to the push button.

2. The connector of claim 1, wherein an upper surface of the housing has a hole through which the push button is externally exposed,
wherein the push button is actuated to move within the housing by application of the external force.

3. The connector of claim 1, further comprising an elastic member that supports the push button in a position separating the push button from the fastening release portions.

4. The connector of claim 1, further comprising an insulating barrier disposed between the first and second connection parts to electrically isolate the first and second connection parts from each other.

5. The connector of claim 1, wherein the push button is further configured to be actuated by the external force applied thereto to release mechanical and electrical connections between the first connection part and the first wire and mechanical and electrical connections between the second connection part and the second wire.

6. The connector of claim 1, wherein the first and second connection parts are symmetrical to each other relative to the push button.

7. The connector of claim 1, wherein the housing is provided by molding the first and second connection parts.

8. The connector of claim 1, wherein at least a portion of the soldering portion is exposed downwardly of the housing to be bent in a direction in which the wire extends.

9. A light source module comprising:
a circuit board;
a plurality of light emitting devices disposed on the circuit board; and
at least one connector disposed on a surface of the circuit board and electrically connected to the plurality of light emitting devices,
wherein the at least one connector comprises:
a first connection part configured to receive and connect to a first wire inserted thereto;
a second connection part configured to connect to a second wire inserted thereto, the first and second connection parts being disposed to face in opposite directions;
a housing covering the first and second connection parts; and
a push button configured to be actuated by an external force applied thereto to release a connection of the first connection part to the first wire and a connection of the second connection part to the second wire,
wherein each of the first connection part and the second connection part comprises:
a soldering portion having a plate shape and configured to be soldered to the circuit board;
a pair of covering portions extending in a direction intersecting an upper surface of the soldering portion and having portions which are bent to surround a corresponding one of the first and second wires;
a pair of fastening portions extending from the covering portions, respectively, and configured to be connected to the corresponding one of the first and second wires inserted from a position adjacent to an end of the covering portion; and
a pair of fastening release portions disposed above the fastening portions, respectively, spaced apart from each other by a gap, and configured to release a connection of the corresponding one of the first and second wires to the fastening portions when the portion of the push button is inserted into the gap by application of the external force to the push button.

10. The light source module of claim 9, wherein the first and second connection parts are spaced apart from each other.

11. The light source module of claim 9, wherein the circuit board comprises a hole into which the housing is inserted.

12. The light source module of claim 9, wherein the circuit board is a bar-type circuit board.

13. The light source module of claim 12, wherein the at least one connector is disposed on only one side on the circuit board.

14. The light source module of claim 13, wherein the at least one connector comprises first and second connectors, and the first and second connectors are spaced apart from the plurality of light emitting devices by a predetermined distance.

15. A connector comprising:
- a first connection part configured to receive and electrically connect to a first wire inserted into the first connection part in a first direction;
- a second connection part configured to receive and electrically connect to a second wire inserted into the second connection part in a second direction that is opposite to the first direction, the first and second connection parts being symmetrically aligned with each other in a same plane;
- a housing covering the first and second connection parts; and
- a push button configured to be actuated by application of an external force applied thereto to cause release of a connection of the first connection part to the first wire and a connection of the second connection part to the second wire, wherein each of the first connection part and the second connection part comprises:
- a soldering portion having a plate shape and configured to be soldered to a circuit board;
- a pair of covering portions extending in a direction intersecting an upper surface of the soldering portion and having portions which are bent to surround a corresponding one of the first and second wires;
- a pair of fastening portions extending from the covering portions, respectively, and configured to be connected to the corresponding one of the first and second wires inserted from a position adjacent to an end of the covering portion; and
- a pair of fastening release portions disposed above the fastening portions, respectively, spaced apart from each other by a gap, and configured to release a connection of the corresponding one of the first and second wires to the fastening portions when the portion of the push button is inserted into the gap by application of the external force to the push button.

16. The connector of claim 15, wherein the first and second connection parts are electrically isolated from each other.

17. The connector of claim 15, wherein the housing comprises an upper surface having a hole through which the push button is exposed.

18. The connector of claim 17, wherein the housing further comprises a first side surface having a first insertion hole through which the first wire is inserted, and a second side surface opposite to the first side surface and having a second insertion hole through which the second wire is inserted.

* * * * *